Figure 1:
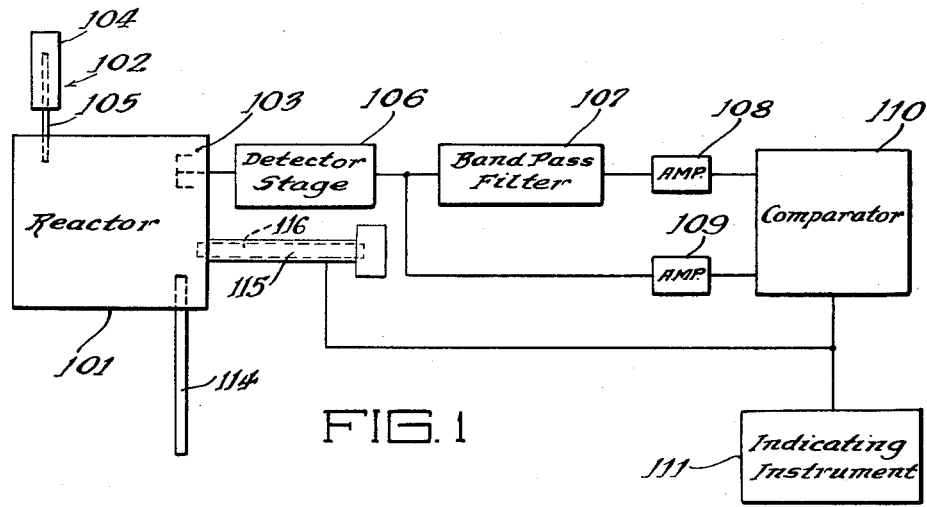

April 5, 1960   H. HURWITZ, JR   2,931,761
NEUTRONIC REACTOR CONTROL
Filed Dec. 14, 1955

INVENTOR.
Henry Hurwitz, Jr.
BY
Roland A. Anderson
Attorney

United States Patent Office 2,931,761
Patented Apr. 5, 1960

2,931,761

NEUTRONIC REACTOR CONTROL

Henry Hurwitz, Jr., Schenectady, N.Y., assignor to the United States of America as represented by the United States Atomic Energy Commission Application December 14, 1955, Serial No. 553,160

2 Claims. (Cl. 204—193.2)

This invention relates in general to neutronic reactors and more particularly to methods and apparatus for controlling the operation of neutronic reactors.

A neutronic reactor, as is well known in the art, usually comprises a reflector of moderator material surrounding a core containing thermal-neutron fissionable material, control elements for regulating the release of neutrons from the fissionable material and means for removing the heat generated by the fission of said material. Detailed information as to the theory and construction of various neutronic reactors are set forth in Patent 2,708,656, issued to Enrico Fermi and Leo Szilard, on May 17, 1955.

The control elements are made of material having high neutron capture cross-section characteristics and are used to control the amount of neutron release in the active portion of the reactor. If a chain reaction is to be established in the neutronic reactor, the minimum condition is that for each nucleus capturing a neutron and undergoing a fission, there shall be released on the average, at least one neutron which will effect fission of another nucleus. This condition can be conveniently expressed by a multiplication factor defined as a ratio of the number of neutrons of any one generation to the number of neutrons in the preceding generation, or as $$k = \frac{n}{n_0}$$

where $k$ is the multiplication factor, $n_0$ is the initial number of neutrons per unit volume and $n$ is the number of neutrons in the next generation.

The neutrons emitted as a result of the fission process can be divided into prompt and delayed neutron fractions or groups. If the thermal neutron fissionable fuel $U^{235}$ is considered, the prompt neutron group comprises about 99.25 percent of the total fission neutrons and is released within an extremely short interval of time, about $10^{-14}$ seconds, of the fission process. The delayed neutron group, on the other hand, comprises the remainder of the fission neutrons, namely 0.75 percent, various portions of which are released at times between 0.6 and 80 seconds. If the fraction of the fission neutrons which is delayed is represented by a symbol B then $1-B$ would represent the fraction of the fission neutrons which are prompt. Thus if the total number of fission neutrons produced for each thermal neutron absorbed in the fuel is indicated by $n$, then $(1-B)n$ are emitted instantaneously and $Bn$ are released over a period of time. Therefore, the multiplication factor may be considered as consisting of two parts; one, equal to $k(1-B)$, representing the prompt neutron multiplication factor, and the other equal to $kB$, representing the delayed neutron multiplication factor. This relationship can be expressed simply as $$k = k_p + k_d$$

where $k_p$ represents the component of the multiplication factor due to the fraction of the prompt neutrons and $k_d$ represents the component of the multiplication factor due to the fraction of the delayed neutrons.

If, in the operation of a nuclear reactor, the quantity $k_p$ is adjusted by means of control elements so that the quantity is less than or equal to unity, then the rate of increase of the released neutrons of one generation over the preceding generation will be determined primarily by the delayed neutrons. Since $k_d$ is about 0.0075 for thermal fission in the steady state, this condition can be realized by having the total multiplication factor restricted in a range extending from unity to 1.0075. Whenever the magnitude of $k$ is maintained within the above range, the neutron flux and the power level of the reactor will increase relatively slowly, thereby enabling effective control to be extended over the reactor.

When the multiplication factor $k$, is equal to 1.0075, the condition of the reactor, as is familiar to those versed in the art, is described as "prompt critical," since the nuclear fission chain can be maintained by means of the prompt neutrons alone. The reason for this is that if $k$ exceeds the value 1.0075, then $1.0075 \times 99.25\% = 0.9999+$ and multiplication will occur due to prompt neutrons, irrespective of those delayed, and the neutron density will increase so rapidly that damage or destruction will occur before the condition can be rectified. In order to maintain control over the reactor, it is therefore necessary that the prompt multiplication factor, $k_p$, be kept less than one. The various devices that are used at the present time in the nuclear art for detecting increases in neutronic reactivity give an indication which corresponds to both prompt and delayed neutron activities. Since the indication is dependent on the power level of the reactor, the power level obscures small changes in prompt neutron reactivity. As a result, a gradual approach to prompt criticality is difficult to observe.

The main object of the invention is to provide a method for determining the approach to prompt criticality by a neutronic reactor undergoing a change in reactivity, wherein the method is fast and reliable and is not dependent on the power level of the reactor.

Another object of the invention is to provide a method for detecting accurately small changes in neutronic reactivity over a wide operating range of a neutronic reactor.

Another object of the invention is to provide a reliable apparatus for indicating the approach to prompt criticality by a neutronic reactor undergoing a change in nuclear reactivity.

A further object of the invention is to provide means for detecting and indicating reactivity excursions occurring during the operation of a neutronic reactor and to safeguard the reactor against reaching prompt criticality.

Figure 2:
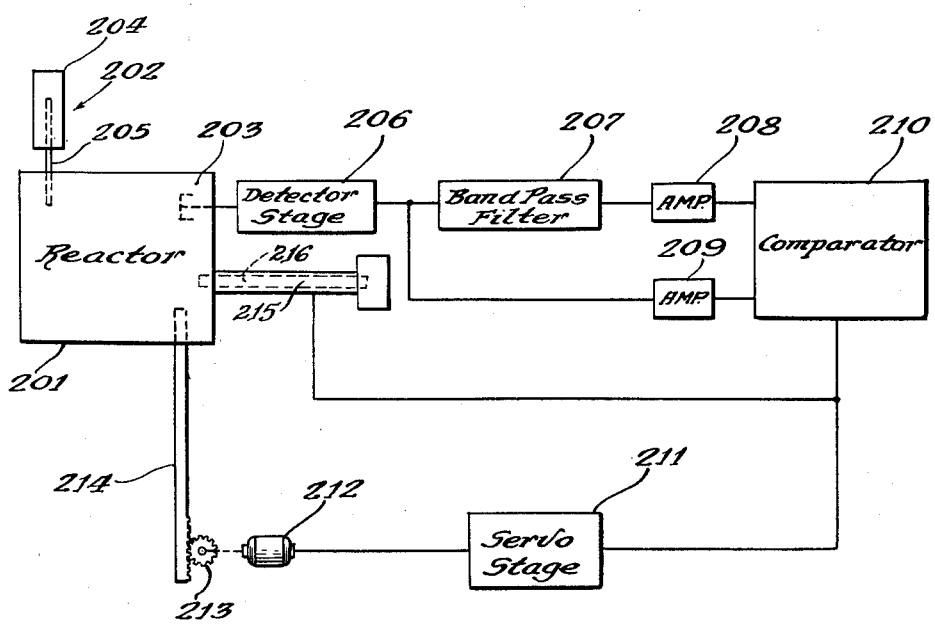

Further objects and advantages of this invention will become apparent and will be better understood by reference to the following description in conjunction with the accompanying drawing, wherein:

Fig. 1 is a block diagram of an embodiment of the invention, for determining the approach to prompt criticality by an operating neutronic reactor; and Fig. 2 is a block diagram of a modified embodiment of the invention.

In accordance with the teaching of this invention, there are provided a method and an apparatus for determining the approach to prompt criticality by a neutronic reactor undergoing an increase in neutron reactivity. The method can be understood with reference to the apparatus which comprises a vibrating control element for varying the nuclear reactivity in the active portion of the reactor at an appropriate frequency and a detector for measuring the neutron flux. The output of the detector is fed into two channels, the first channel comprising a narrow band filter with band pass frequency equal to that of the vibrating control element and an amplifier, and the second channel containing only an amplifier. The output from the filter is a measure of the variation of the neutron flux which occurs at the frequency of the vibrating absorber, and the output of the second channel represents the composite change occurring in the reactor due to the periodically oscillating change in flux as well as that due to temperature changes, fuel depletion, etc. The variable (A.C.) output from the first channel is compared with the average (D.C.) output of the second channel to obtain a ratio which is indicative of the value of $k_p$. As a result of this arrangement, the measurement is made independent of the absolute value of the power level at which the reactor is being operated. Means are also provided to shut down the reactor when $k_p$ exceeds a preset value.

The apparatus, to be described hereinafter, gives a continuous reading of a quantity which is proportional to $$\frac{1}{1-k_p}$$

and is independent of the power level of the reactor. Under steady state conditions, the quantity, $1-k_p$, will be about 0.0075 for natural uranium fuel. This quantity should never be allowed to decrease to less than 0.0035, so that the apparatus may be used to trip an emergency safety control if $$\frac{1}{1-k_p}$$

exceeds a certain value. An oscillator in the apparatus comprises a vibrating control element which is used to effect a continuous variation in neutron flux which variation is subsequently monitored by the remainder of the apparatus and changed into a signal corresponding to the prompt and delayed fractions of the neutron flux in the reactor. In order to obtain an output corresponding to the change in $k_p$, it is necessary that the frequency of the oscillator be maintained within a certain range, as will be indicated hereinafter. Essentially, the frequency of the oscillator must be large compared to the reciprocal of the period of the delayed neutrons but small compared to the reciprocal of the prompt neutron period. The apparatus divides the output of the first channel by the output of the second channel to obtain a quantity which is proportional to $$\frac{1}{1-k_p}$$

which quantity is independent of the power level of the reactor. Having a continuous measurement of this quantity is of considerable help in operating the reactor.

As was indicated hereinabove, the quantity $1-k_p$ would be equal to about 0.0075 or $k_p$ would be equal to 0.9925 under normal operating conditions. Therefore, the ratio $$\frac{1}{1-k_p}$$

would be equal to 133.3. Since the self-imposed limitation, as stated before, is to maintain the quantity $1-k_p$ greater than 0.0035, then $k_p$ would be equal to 0.9965. This would result in the ratio $$\frac{1}{1-k_p}$$

having a value of 285.7. It is, however, to be understood that the above limitation may be varied depending upon the safety factor desired, the type of fissionable fuel used and also upon the sensitivity of the protective system designed to shut down the reactor during abnormal reactivity increase. It is not intended that above-recited values be construed as limitations of the method and apparatus to be described in detail hereinafter.

Referring to Fig. 1, the embodiment of the invention comprises a reactor 101 associated with an oscillator 102 and a neutron flux detector 103. The oscillator 102 comprises a mechanism 104 which is adapted to actuate an element or rod 105 attached to said mechanism and penetrating into the confines of the reactor 101. The mechanism 104 is capable of oscillating or moving the rod 105 at the desired frequency to thereby vary the neutron reactivity in the reactor 101. The rod 105 is made of material having high neutron capture cross-section characteristics such as boron or cadmium. The output of the detector 103 is fed into a detector stage 106 which amplifies the input signal and feeds part of the signal into a first channel comprising a band pass filter 107 and an amplifier 108, and feeds the remainder of the signal into a second channel comprising an amplifier 109. Both of the channels terminate in a comparator 110. The output of the comparator 110 is connected to an indicating instrument 111, such as an ammeter. The components of the apparatus are shown in block form because they are conventional and require no further details as to their construction and operation.

The neutron detector 103 may be any one of the many conventional instruments available for measuring neutron flux, the output of said neutron detector being connected to the detector stage 106 for amplification purposes. The filter 107 has a narrow band pass which is selective to the operating frequency of the reactor oscillator 102. Thus, the output from the first channel is a measure of only that part of the neutron flux which varies with the period of the reactor oscillator 102. The comparator 110 utilizes conventional circuits and serves to compare the outputs of the amplifiers 108 and 109 and provides a resultant output which corresponds to a ratio of the effective component to the instantaneous average component of the reactor output. The ratio of the frequency output or the variable output from the amplifier 108 to the D.C. (that is, average) component of the amplifier 109 is proportional to the fraction $$\frac{1}{1-k_p}$$

The indicating instrument 111 gives a visual indication of the magnitude of $k_p$ to an operator who is governed thereby to actuate a control element 114 for varying the reactivity in the active portion of the reactor 101. A safety device 115 is connected to the output of the comparator 110, which device functions to shut down rapidly the reactor 101 whenever $k_p$ exceeds a preset value. The safety device 115, when energized, introduces an element 116 (shown by hidden lines) made of neutron absorbing material into the reactor to absorb neutrons in the active portion thereof.

A modified embodiment of the invention is shown in Fig. 2. The components comprising the modification are conventional and are very similar to those shown in Fig. 1 with the exception that an automatic control system is provided for controlling reactivity during the operation of the reactor. Specifically, a reactor 201 has incorporated therewith an oscillator 202 comprising a mechanism 204 provided for actuating an element or rod 205, and a neutron detector 203. The output of the neutron detector 203 is fed by way of a detector 206 into two channels; the first channel comprising a band pass filter 207 and an amplifier 208 and the second channel comprising an amplifier 209. The outputs of both of the channels are connected to a comparator 210. The output of the comparator 210 is fed into a servo stage 211 which controls a motor 212 which is used to actuate a control rod 214 by means of suitable gear linkage arrangement 213. A safety device 215, having an element 216 (shown by hidden lines), is connected to the output of the comparator 210.

The function of the various stages shown in Fig. 2 is similar to that of the stages shown in Fig. 1. The servo stage 211 serves to control the insertion and the withdrawal of the control rod 214 and out of the reactor 201.

The control rod 214, as well as 114, is made of any material having a high thermal-neutron capture cross-section, for example, boron or cadmium. The circuits utilized in the servo stage 211 are conventional and require no further discussion. The comparator 210 functions to compare the outputs of the amplifiers 208 and 209 wherein the ratio of the outputs from said amplifiers is proportional to the fraction $$\frac{1}{1-k_p}$$

The servo stage 211 is preset at a particular value so that whenever the ratio, as computed, by the comparator 210, exceeds a predetermined value, the servo stage will energize the motor 212 to thereby actuate the control rod 214 in such a manner as to maintain a proportional relationship to quantity $$\frac{1}{1-k_p}$$

Depending upon the requirements of reactor operation, the sensitivity of the servo stage 211 may be adjusted so that it will respond at a desired speed whenever the measured quantity deviates from the preset value. The function of the safety device 215 is to shut down rapidly the reactor whenever the value of $k_p$ exceeds a predetermined limit.

The method and apparatus discussed herein have been developed to increase safely the reactivity in a reactor, whether it is at zero power or at some intermediate power setting. To increase the power output of the reactor, a control element, such as 114, is manipulated to increase reactivity in a reactor, such as 101. At the same time, another control element, such as 105, is oscillated at a predetermined frequency to effect a neutron flux change having oscillatory nature. The magnitude of the flux change is detected and connected into an output. This output is of composite nature in that it has an average component which corresponds to the total of neutron flux brought about by the first control element and it has an effective component which corresponds to the variation in the neutron flux caused by the oscillating control element. Since the ratio of the effective component to the average component is proportional to the quantity $$\frac{1}{1-k_p}$$

the magnitude of the prompt multiplication factor $k_p$ is available to personnel operating the reactor, said personnel being directed thereby to effect further reactivity changes within prescribed safe limits. Should the personnel fail to respond to control properly further increase in reactivity, a safety device, such as 115, will operate to shut down the reactors when the quantity $$\frac{1}{1-k_p}$$

reaches a predetermined limit.

The apparatus and the method discussed hereinbefore can be applied not only to thermal but also to intermediate reactors. If most of the fissions result from the capture of thermal neutrons, the system is known as a thermal reactor but if most of the fissions are due to absorption of neutrons of higher energy, sometimes called intermediate neutrons, the reactor is called intermediate. Neutrons possessing energies up to 0.025 E.V. at 25° C. are commonly termed thermal neutrons and those possessing energies between 0.025–1000 E.V. are commonly known as intermediate neutrons. An important type of an intermediate reactor is one in which most of the fissions are induced by neutrons reaching from thermal values up to about 1000 E.V. From the usual equations of reactor kinetics, as found in "Elementary Pile Theory," by H. Soodak et al., John Wiley and Sons, Inc., New York, 1950, it can be shown that the ratio of output of the filter to the D.C. component (that is, instantaneous average) of the neutron flux is proportional to the quantity $$\frac{1}{1-k_p}$$

provided that the oscillation frequency is large compared to the reciprocals of the periods of the delayed neutrons, but small compared to the reciprocal of the prompt neutron period.

As was previously brought out, the neutrons are classified as delayed and prompt. The mean lives of the delayed neutrons vary between 0.07–80.3 seconds, the average time of delay of the neutrons being 12.2 seconds, as is indicated in "Introduction to Nuclear Engineering," by R. L. Murray, Prentice-Hall, Inc., 1954, page 151. It has been shown quite generally that the quantity which determines the prompt period of a reactor is the average time, $\bar{t}$, that it takes a neutron to produce a fission. The average time, $\bar{t}$, for producing a fission in an intermediate reactor is about $0.8 \times 10^{-6}$ sec. The expression for the prompt neutron period of the reactor is $$\frac{\bar{t}}{1-k_p}$$

In the consideration of the intermediate reactor, the relation of the frequency of oscillation to the aforementioned reciprocals of various periods can be indicated as $$P_d \gg P_f \gg P_r$$

wherein $P_f$ is the period of the reactor oscillator, $P_d$ is the average period of the delayed neutrons and $P_r$ is the prompt period of the reactor. Since $$P_d = 12.2 \text{ and } P_r = \frac{\bar{t}}{1-k_p} = \frac{0.8 \times 10^{-6}}{.007} \approx 10^{-4}$$

then $$12.2 \gg P_f \gg 10^{-4}$$

In the above situation, a frequency of 10–100 c.p.s. (.1–.01 second periods) satisfies this condition. The response time of the apparatus described herein corresponds to a few cycles of the reactor oscillator. For example, with an oscillation frequency of about 100 cycles per second, the response time is about 0.03 second. Thus, the apparatus is capable of following any changes in $k_p$ which occur in the reactor within the discussed limits. The method and device described hereinbefore can be used for detecting the approach to prompt criticality by an operating reactor undergoing an increase in power and also for detecting the approach to prompt criticality by a reactor which is initially started. Also, the method and apparatus may be used for measuring the dynamic response to transitory changes undergone in the reactor. The device can be used to measure the temperature coefficient of reactivity in a particular reactor. These measurements are very useful in checking the reactor design and in improving future designs.

While there have been described what is at present considered to be the preferred embodiment of the invention, it will be understood that various modifications may be made herein and it is intended in the appended claims to cover all such modifications as found within the true spirit and scope of the invention.

What is claimed is:

1. An apparatus for indicating the approach to prompt criticality of a neutronic reactor comprising an element made of a neutron-absorbing material, means for oscillating the element in the active portion of the reactor at a frequency which is large compared to the reciprocal of the period of the delayed neutrons but small compared to the reciprocal of the period of the prompt neutrons to vary the reactivity of the reactor, a detector for measuring the neutron flux and converting the flux into a signal having a variable component and a steady component, the output of said detector being directed into a first channel including a narrow band filter with band pass frequency equal to that of the oscillating control element and an amplifier and a second channel including an amplifier, and means connected to said channels for indicating the ratio of the signal produced by the first channel to that produced by the second channel which ratio constitutes an indication of the approach to prompt criticality which is independent of power level.

2. An apparatus for controlling a neutronic reactor comprising an element made of a neutron-absorbing material, means for oscillating the element in the active portion of the reactor at a frequency which is large compared to the reciprocal of the period of the delayed neutrons but small compared to the reciprocal of the period of the prompt neutrons to vary the reactivity of the reactor, a detector for measuring the neutron flux in the reactor and converting the flux into a signal having a variable component and a steady component, the output of said detector being directed into a first channel including a narrow band filter with band pass frequency equal to that of the oscillating control element and an amplifier and a second channel including an amplifier, means connected to said channels for indicating the ratio of the signal produced by the first channel to that produced by the second channel, and means for controlling the reactor in accordance with said indication.

References Cited in the file of this patent

MDDC-1664, "The Clinton Pile Oscillator," by Hoover et al., USAEC document declassified Jan. 26, 1948, pages 1-8.

AECD-2044, "Theory of Oscillating Absorber in a Chain Reactor," by Weinburg, USAEC document declassified June 7, 1948, pages 1 and 2.

Physical Review, vol. 74 (1948), pages 851, 852, 864–870, 1217.

Atomics, vol. 2 (February 1951), pages 55, 56.

"Principles of Nuclear Reactor Engineering," Samuel Glasstone, D. Van Nostrand Co., N.Y., 1st ed., July 1955, pp. 37, 38, 39, 354, 355.